United States Patent
Figge et al.

[11] Patent Number: 6,140,400
[45] Date of Patent: Oct. 31, 2000

[54] REDISPERSIBLE TACKIFIER POWDERS

[75] Inventors: Reiner Figge, Ampfing; Rudolf Weissgerber, Burghausen, both of Germany

[73] Assignee: Wacker-Chemie GmbH, Munich, Germany

[21] Appl. No.: 09/068,906

[22] PCT Filed: Jan. 16, 1997

[86] PCT No.: PCT/EP97/00172

§ 371 Date: May 20, 1998

§ 102(e) Date: May 20, 1998

[87] PCT Pub. No.: WO97/26307

PCT Pub. Date: Jul. 24, 1997

[30] Foreign Application Priority Data

Jan. 18, 1996 [DE] Germany .................... 196 01 697

[51] Int. Cl.[7] .............. C08J 3/22; C08L 93/04; C08K 5/11; C08K 5/12; C08K 5/06
[52] U.S. Cl. ............... 524/272; 156/327; 523/351; 524/272; 524/296; 524/297; 524/314; 524/369; 524/376; 524/377; 524/386; 525/149; 525/163; 525/207; 525/210; 525/211
[58] Field of Search ............... 523/351; 524/272, 524/296, 297, 314, 369, 376, 377, 386; 525/149, 163, 207, 210, 221; 156/327

[56] References Cited

U.S. PATENT DOCUMENTS

| 2,677,672 | 5/1954 | Luce | 525/207 |
|---|---|---|---|
| 4,322,330 | 3/1982 | Merz et al. | 524/297 |
| 4,322,516 | 3/1982 | Wiest et al. | 526/304 |
| 4,324,871 | 4/1982 | Acharga et al. | 525/149 |
| 4,338,414 | 7/1982 | Acharga et al. | 525/210 |
| 4,338,415 | 7/1982 | Acharga et al. | 525/210 |
| 4,338,416 | 7/1982 | Acharga et al. | 525/210 |
| 4,340,687 | 7/1982 | Acharga et al. | 525/210 |
| 4,431,760 | 2/1984 | Giddings et al. | 524/296 |
| 4,681,909 | 7/1987 | Ohta et al. | 524/272 |
| 4,714,728 | 12/1987 | Graham et al. | 524/272 |
| 4,975,481 | 12/1990 | Tamm et al. | 524/317 |
| 5,196,468 | 3/1993 | Schwerzel et al. | 524/272 |

FOREIGN PATENT DOCUMENTS

| 0023360 | 2/1981 | European Pat. Off. . | |
| 0017986 | 12/1982 | European Pat. Off. . | |
| 0620243 | 10/1994 | European Pat. Off. . | |
| 0490191 | 6/1997 | European Pat. Off. . | |
| 3737630 | 5/1989 | Germany . | |
| 3737360 | 4/1992 | Germany . | |
| 540 | 1/1976 | Japan | 524/297 |
| 67772 | 3/1983 | Japan | 525/207 |
| 80370 | 5/1983 | Japan | 524/272 |
| 225676 | 9/1988 | Japan | 524/272 |
| 311144 | 12/1989 | Japan | 524/272 |

OTHER PUBLICATIONS

Derwent Abstract corresponding to EP–620243 (#94–318338).
Derwent Abstract corresponding to DE–3737360 (#88–134228).

*Primary Examiner*—Peter A. Szekely
*Attorney, Agent, or Firm*—Burgess, Ryan & Wayne

[57] ABSTRACT

Redispersible tackifier powder compositions which are redispersible in water are provided and which are comprised of one or more tackifying substances and from 2 to 50% by weight of one or more water-soluble low molecular weight homo or copolymers of olefinically unsaturated mono or dicarboxylic acids or their anhydrides. The copolymers also contain other free-radically polymerizable monomers. Anti-blocking agents can also be present. Adhesives containing the compositions are also provided.

11 Claims, No Drawings

REDISPERSIBLE TACKIFIER POWDERS

BACKGROUND OF THE INVENTION

1) Field of the Invention

The invention relates to redispersible tackifier powders and to adhesives which comprise redispersible tackifier powders in powder form or in the form of their aqueous redispersion.

2) Background Art

Use as adhesives is an important area of application for polymers, for example homopolymers or copolymers of vinyl esters, (meth)acrylic esters or styrene. An example of this is the use of vinyl acetate-ethylene copolymers as flooring adhesives (EP-A 23360, U.S. Pat. No. 4,322,330). EP-A 620243 describes the use of vinyl ester-acrylate copolymers as contact adhesives or flooring adhesives. DE-A-3737630 (U.S. Pat. No. 4,975,481) relates to contact adhesives which are based on ethylene-vinyl acetate copolymers. EP-A 17986 (U.S. Pat. No. 4,322,516) disclosed contact adhesives based on acrylate-vinyl acetate-ethylene copolymers. EP-A 490191 (U.S. Pat. No. 5,196,468) relates to the use of aqueous acrylate latices as flooring adhesives. In the applications mentioned these polymers can in principle be used in the form of their powders or aqueous dispersions.

Especially for use as contact adhesives or flooring adhesives, the addition of tackifying substances, tackifiers, including tackifier resins, is often necessary in order to improve the tackiness. These tackifiers can be added to the aqueous dispersion as a solution in plasticizer (EP-A 23360). DE-A-3737360 discloses the addition of the tackifier to the polymer dispersion as a solution in organic solvent or in the form of its melt. EP-A 490191 describes a procedure in which a melt of tackifier resin and surface-active substances is added to the adhesive dispersion. In EP-A 620243, an aqueous suspension of the tackifier resin is added to the adhesive dispersion.

In the case of the tackifier solutions, a disadvantage of these procedures is the release of the volatile solvent during or after processing. Adding tackifier resins in the form of the melt is a time-consuming and energy-intensive process step which makes the production of the adhesive more expensive. When aqueous tackifier dispersions are added, there is a normally unwanted dilution of the adhesive dispersion. Moreover, it is not possible without taking additional steps to mix aqueous tackifier dispersions homogeneously with adhesive powder.

The object was therefore to provide a tackifier composition which can be used to modify both pulverulent and aqueous adhesives without the abovementioned disadvantages occurring.

SUMMARY OF THE INVENTION

The object has been achieved by water-redispersible, pulverulent tackifier compositions which can be employed simply both in pulverulent adhesives and in aqueous adhesive dispersions.

The invention provides water-redispersible tackifier powder compositions comprising a) one or more tackifying substances,
b) from 2 to 50% by weight, based on the overall dry mass of the tackifying substances, of one or more compounds from the group consisting of water-soluble, low molecular mass homopolymers or copolymers of olefinically unsaturated mono- or dicarboxylic acids or their anhydrides, which as copolymers also contain from 2 to 50 mol % of further free-radically polymerizable monomers, and of phenolsulphonic, melaminesulphonic and naphthalenesulphonic acid condensates, the water solubility of the abovementioned compounds being at least 10 g in 100 g of water at 23° C. and their molecular weight being ≦250,000 g/mol, determined as weight average,
c) from 0 to 30% by weight, based on the overall weight of the polymeric constituents, of antiblocking agents, and
d) from 0 to 50% by weight, based on the overall weight of the composition, of other additives.

DESCRIPTION OF THE PREFERRED EMBODIMENTS

Suitable tackifying substances are those customarily employed as tackifiers, examples being the rosins, also known as balsam resins or tall resins, and derivatives thereof, such as dimerized, disproportionated and hydrogenated rosin. Further examples are the glycol esters, glycerol esters and pentaerythritol esters of the balsam resins, such as rosin diethylene glycol ester, hydrocarbon resins, polyterpene resins, coumarone-indene resins and terpene-phenol resins.

Also suitable are liquids such as diethylene glycol monobutylether acetate, diethylene glycol mono-butyl ether, dipropylene glycol monoether, dipropylene glycol diether, dipropylene glycol monoester, dipropylene glycol diester, plasticizers such as phthalates, sebacates and adipates. These substances can also be employed in the form of their mixtures.

Preference is given to the abovementioned rosins and to their esters, diethylene glycol mono-butylether acetate and 2-hydroxyethyl phenyl ether.

As component b) preference is given to water-soluble, unneutralized or partially neutralized homopolymers or copolymers of olefinically unsaturated mono- or dicarboxylic acids or their anhydrides, for example homopolymers or copolymers of acrylic acid, methacrylic acid or maleic acid (anhydride), especially polyacrylic acid or polymethacrylic acid. Preference extends to copolymers with acrylic, methacrylic or maleic acid (anhydride) units and units of monomers copolymerizable therewith, the acid content of these copolymers being, in particular, more than 80 mol %. Examples of copolymerizable monomers are alkenes such as ethylene or propylene, vinyl-aromatic compounds such as styrene, and preferably acrylates, such as butyl acrylate, methacrylates, such as methyl methacrylate, alkyl vinyl ethers, such as methyl vinyl ether, methacrylamide and acrylamide. Examples of preferred copolymers are maleic acid-methyl vinyl ether, methacrylic acid-methyl methacrylate and methacrylic aid-acrylamide copolymers. "Water-soluble" here refers to a solubility of at least 10 g in 100 g of water at 23° C.

The molecular weights of these polymers are in the range ≦250,000 g/mol, preferably ≦150,000 g/mol; with particular preference, the molecular weight is from 5000 to 50,000 g/mol, determined as the weight average by means, for example, of gel permeation chromatography.

The polymers described as component b) are prepared conventionally in processes known to the skilled worker, for example solution polymerization or bulk polymerization. In many cases these polymers are also obtainable commercially.

The amount of component b) in the tackifier powder composition is preferably from 5 to 35% by weight, based on the overall dry mass of the tackifying substance.

By means of neutralization of the unneutralized or partially neutralized homopolymers of copolymers of olefinically unsaturated mono- or dicarboxylic acids or their anhydrides that were specified as preferred for component b) it is possible to open up access to compositions with deactivated protective colloid. It has in fact been found that in many applications the protective colloids employed in the known dispersion powders have an adverse effect on the properties of the product. Owing to the protective colloid nature of the water-soluble spraying aids, for example in the case of adhesive applications, the proportion of protective spraying colloid in many cases has an adverse influence on the tackiness of the adhesives and/or of the tackifier additives.

Neutralization can be accomplished in such a way that a tackifier powder composition already including the appropriate amount of neutralizing agent is prepared, the amount of neutralizing agent in the powder being calculated so as to establish the desired pH range on redispersion. A further option is to redisperse in water a tackifier powder composition which has not been modified with neutralizing agent and to establish the desired pH range by subsequent addition of a neutralizing agent such as, for example, NaOH, KOH or $Ca(OH)_2$.

If neutralization is desired, neutralizing agents will therefore preferably still be present in the novel tackifier powder composition. These neutralizing agents are preferably mixed in with the powder following drying, in combination if desired with further pulverulent additives. The amount of neutralizing agent to be employed depends on the respective tackifier powder composition and on the pH which is to be established in the adhesive dispersions made up with the tackifier powder and water. The appropriate pH, for example, can be determined readily by examining the ease of redispersion when the tackifier powder is stirred into water at different pH levels. Suitable neutralizing agents are the customary inorganic bases, examples being NaOH, KOH and $Ca(OH)_2$.

If antiblocking agent is added, its proportion is preferably from 4 to 20% by weight, based on the overall weight of polymeric constituents. Examples of antiblocking agents (component c) are finely ground aluminium silicates, kieselguhr, pyrogenic silica, precipitated silica, colloidal silica gel, microsilica, kaolin, talc, diatomaceous earth, calcium carbonate and magnesium hydrosilicate. Particularly preferred antiblocking agents are those with mean particle sizes of from 0.1 to 50 $\mu$m.

Depending on the intended application the tackifier powder composition may if desired include further additives.

It is possible if desired for there to be from 0.5 to 20% by weight, preferably from 0.5 to 10% by weight, based on the base polymer, of hydrophobicizing agents present, based for example on polysiloxanes or metal soaps.

Furthermore, it is possible for there to be from 0.1 to 2.0% by weight, preferably from 0.1 to 1.0% by weight, based on the base polymer, of surface-active substances present, such as emulsifiers or wetting agents. Examples of these are anionic and nonionic surfactants.

If desired it is possible as well for there to be from 0.5 to 15% by weight, preferably from 0.5 to 10% by weight, based on the base polymer, of thickeners present, based for example on high molecular mass polyacrylic acids.

A further example of common additives are defoamers, which can be employed if desired in a proportion of from 0.05 to 2.0% by weight, preferably from 0.05 to 1.0% by weight, based on the base polymer.

To prepare the water-redispersible tackifier powder composition the tackifying substance, the tackifier a), is employed as an aqueous dispersion or emulsion. To this dispersion/emulsion is added the protective spraying colloid b), preferably in the form of an aqueous solution, and is mixed in. However, it is also possible to start with some or all of the protective spraying colloid as an aqueous solution and to add the tackifying substance (tackifier) either in emulsified/dispersed form or directly, in bulk or as a melt. A precondition for the use of a non-preemulsified component a) is a sufficient degree of emulsification or dispersion in the aqueous solution of component b), so that a homogeneous dispersion or emulsion is present. The optional thickeners, surface-active substances, hydrophobicizing agents, defoamers and any other additives are preferably added to the aqueous mixture prior to drying.

After the components have been mixed the dispersion is dried, preferably spray-dried or freeze-dried, and particularly preferably spray-dried. For this operation it is possible to employ known apparatus, spraying for example through multi-substance nozzles or with a disc in a heated or unheated stream of drying gas. The drying gas employed is generally air, nitrogen, or nitrogen-enriched air, and its temperature does not generally exceed 250° C. The optimum drying gas temperature can be determined in a few experiments; in many cases drying-gas temperatures above 60° C. have proved particularly appropriate.

To increase the storage temperature, in order for example to prevent caking and blocking and/or to improve the flowability of the powder, an antiblocking agent c) can be added to the powder. This addition is made preferably while the powder is still finely divided, for example while it is still in suspension in the drying gas. In particular, the antiblocking agent is metered to the drying apparatus separately from but simultaneously with the dispersion.

If the tackifier powder composition is to include one or more neutralizing agents, these are preferably added in solid form to the tackifier powder. The neutralizing agents can also be metered into the drying device separately from but simultaneously with the dispersion. For this variant of the process, spray drying has proved particularly appropriate.

The tackifier powder composition is added to the aqueous adhesive dispersions or pulverulent adhesives to be tack-modified. The tackifier powder can be added in powder form or in the form of an aqueous dispersion. The amount used ranges generally from 1 to 150% by weight of tackifier powder, based on the base polymer in the adhesive.

The invention additionally provides pulverulent adhesives and aqueous adhesive dispersions which comprise the tackifier powder composition in powder form or in the form of its aqueous redispersion.

Suitable adhesive powders or aqueous adhesive dispersions are those based on water-insoluble polymers from the group consisting of the homopolymers and copolymers of vinyl esters, acrylic esters, methacrylic esters, styrene and vinyl chloride, or a mixture of these base polymers.

Suitable vinyl ester homopolymers or copolymers comprise one or more monomer units from the group consisting of the vinyl esters of unbranched or branched carboxylic acids having 1 to 18 carbon atoms. Suitable (meth)acrylic ester polymers are homopolymers and copolymers of acrylic acid and methacrylic acid with unbranched or branched alcohols having 1 to 18 carbon atoms.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 5 or 9 to 10 carbon atoms, for example $VV5^R$, $VeoVa9^R$ or $VeoVa10^R$. Vinyl acetate is particularly preferred.

Preferred methacrylic esters and acrylic esters are methyl acrylate, methyl methacrylate, ethyl acrylate, ethyl methacrylate, propyl acrylate, propyl methacrylate, n-butyl acrylate, n-butyl methacrylate, iso-butyl acrylate, iso-butyl methacrylate, t-butyl acrylate, t-butyl methacrylate, 2-ethylhexyl acrylate, 2-ethylhexyl methacrylate. Particular preference is given to methyl acrylate, methyl methacrylate, n-butyl acrylate and 2-ethylhexyl acrylate.

Examples of suitable vinyl ester polymers are:

vinyl ester homopolymers, such as vinyl acetate homopolymer;

vinyl ester-ethylene copolymers, such as vinyl acetate-ethylene copolymers with an ethylene content of from 1 to 60% by weight;

vinyl ester-ethylene-vinyl chloride copolymers, such as vinyl acetate-ethylene-vinyl chloride copolymers with an ethylene content of from 1 to 40% by weight and a vinyl chloride content of from 20 to 80% by weight;

vinyl acetate copolymers with 1 to 50% by weight of one or more copolymerizable vinyl esters such as vinyl laurate, vinyl pivalate, vinyl 2-ethylhexanoate, vinyl esters of an α-branched carboxylic acid, especially Versatic acid vinyl esters a blend of 7, 9 and 11 carbon acid vinyl esters (VeoVa$9^R$, VeoVa$10^R$), which may also contain 1 to 40% by weight of ethylene;

vinyl ester-acrylic ester copolymers with from 30 to 90% by weight of vinyl ester, especially vinyl acetate, and from 1 to 60% by weight of acrylic ester, especially n-butyl acrylate or 2-ethylhexyl acrylate, which may also contain from 1 to 40% by weight of ethylene;

vinyl ester-acrylic ester copolymers with from 30 to 75% by weight of vinyl acetate, from 1 to 30% by weight of vinyl laurate or vinyl esters of an α-branched carboxylic acid, especially Versatic acid vinyl ester, a blend of 7, 9 and 11 carbon acid vinyl esters from 1 to 30% by weight of acrylic ester, especially n-butyl acrylate or 2-ethylhexyl acrylate, which may also contain from 1 to 40% by weight of ethylene;

vinyl ester copolymers with esters of maleic acid or fumaric acid, such as diisopropyl, di-n-butyl di-t-butyl, diethyl-hexyl and methyl t-butyl esters, for example vinyl acetate copolymers with from 10 to 60% by weight of one or more of the abovementioned maleic/fumaric esters, which may additionally contain ethylene or other copolymerizable vinyl esters, such as vinyl laurate or Versatic acid vinyl ester.

Examples of suitable (meth)acrylic acid polymers are:

homopolymers of n-butyl acrylate or 2-ethylhexyl acrylate; copolymers with from 35 to 65% by weight of methyl methacrylate, and from 65 to 35% by weight of n-butyl acrylate and/or 2-ethylhexyl acrylate.

Examples of vinyl chloride polymers other than the abovementioned vinyl ester-vinyl chloride copolymers are vinyl chloride-ethylene copolymers.

Examples of styrene polymers are styrene-butadiene copolymers and styrene-acrylate copolymers, such as styrene-n-butyl acrylate or styrene-2-ethylhexyl acrylate with a styrene content in each case of from 1 to 70% by weight.

The abovementioned polymers may also include from 0.05 to 30.0% by weight, preferably from 0.5 to 15% by weight, based in each case on the overall weight of the polymer, of one or more auxiliary monomer units in order to improve solubility in water, for crosslinking or to modify the adhesion properties.

Examples of suitable auxiliary monomers for improving the solubility in water are α,β-monoethylenically unsaturated mono- and dicarboxylic acids and their amides, such as acrylic acid, methacrylic acid, maleic acid, fumaric acid, itaconic acid, acrylamide and methacrylamide; ethylenically unsaturated sulphonic acids and their salts, preferably vinyl-sulphonic acid, 2-acrylamidopropanesulphonate and/or N-vinylpyrrolidone.

Monomer units with a crosslinking action are preferably present in the polymer in a proportion of from 0.5 to 5.0% by weight, based on the overall weight of the polymer. Examples thereof are N-methylolacrylamide, N-methylolmethacrylamide; N-(alkoxymethyl)acrylamides or N-(alkoxymethyl)methacrylamides with a $C_1$- to $C_6$-alkyl radical, such as N-(isobutoxymethyl)acrylamide (IBMA), N-(isobutoxymethyl)methacrylamide (IBMMA), N-(n-butoxymethyl)acrylamide (NBMA), N-(n-butoxymethyl)methacrylamide (NBMMA); polyethylenically unsaturated comonomers, such as ethylene glycol diacrylate, 1,3-butylene glycol diacrylate, 1,4-butylene glycol diacrylate, propylene glycol diacrylate, divinyl adipate, divinylbenzene, vinyl methacrylate, vinyl acrylate, allyl methacrylate, allyl acrylate, diallyl maleate, diallyl phthalate, diallyl fumarate, methylenebisacrylamide, cyclopentadienyl acrylate or triallyl cyanurate.

The adhesive powders or aqueous adhesive dispersions modified with the tackifier powder are particularly suitable for use in contact adhesives, flooring adhesives and in structural adhesives.

EXAMPLES

Substances used:
Tackifier T-1
Snowtack-52CF

Emulsifier-stabilized aqueous emulsion of a rosin, with a solids content of 50%, from Teneco.
Dispersion DI-1

Emulsifier-stabilizer aqueous dispersion with a solids content of 60% based on a vinyl acetate-ethylene-ethylhexyl acrylate copolymer having a 2-ethylhexyl acrylate content of 48% by weight, a vinyl acetate content of 36% by weight and an ethylene content of 16% by weight.
Dispersion powder DP-1

Redispersible powder based on dispersion DI-1 with 20% by weight, based on the solids content of the base dispersion, of polymethacrylic acid as protective spraying colloid.
Protective spraying colloid Sokalan-CP13

Sokalan CP13 is a modified polyacrylic acid with a molecular weight of around 20,000 from BASF.
Protective spraying colloid Versicol-K11

Versicol-K11 is a polymethacrylic acid with a molecular weight of around 10,000 from Allied Colloids.
Protective spraying colloid Suparex-PD41

Suparex-PD41 is a low molecular mass phenolsulphonic acid-formaldehyde condensation product from Hodgson, UK.
Protective spraying colloid Vinnapas M13/140

Vinnapas M13/140 is a polyvinyl alcohol with a degree of hydrolysis of 86–89 mol % from Wacker-Chemie GmbH.

Example 1

4000 parts by weight of tackifier T-1 and 1600 parts by weight of Versicol-K11 as a 25% strength aqueous solution (20% based on T-1 resin) were mixed thoroughly. The pH of the dispersion was 3.8. The mixture was spray-dried by means of a dual-substance nozzle. The spraying component used was air prepressurized to 3 bar; the droplets formed were dried with drying air heated at 120° C. in co-current. The dry powder obtained was blended with 10% by weight of a commercial, kaolin-based antiblocking agent.

Example 2

4000 parts by weight of tackifier T-1 and 1429 parts by weight of Sokalan-CP13 as 28% strength aqueous solution (20% based on T-1 resin) were mixed thoroughly. The pH of the mixture was 3.9. Powder preparation was as in Example 1.

Example 3

4000 parts by weight of tackifier T-1 and 851 parts by weight of Suparex-PD41 as a 47% strength aqueous solution (20% based on T-1 resin) were mixed thoroughly. The pH of the mixture was 6.9. Powder preparation was as in Example 1.

Comparative Example 1

4000 parts by weight of tackifier T-1 and 3636 parts by weight of M13/140 as an 11% strength aqueous solution (20% based on T-1 resin) were mixed thoroughly. The pH of the mixture was 7.6. Powder preparation was as in Example 1.

Performance Tests

Deactivation of the protective spraying colloid

To investigate the deactivation of the protective spraying colloid, the effect of pH of the dispersion to be sprayed on the redispersibility of the tackifier powders obtainable therefrom was investigated. For this purpose, 50 g of the respective tackifier powder were stirred into 50 g of water and the redispersibility was evaluated qualitatively. Table 1 shows how, by neutralizing the protective colloid, it is deactivated and how nondispersible systems are formed from redispersible systems simply by changing the pH. The poorer the redispersibility of this test, the better the tackifying effect in the case of use as tackifier.

TABLE 1

| Tackifier powder | pH of the spray mixture | Redispersibility |
|---|---|---|
| Example 1 | 3.8 | good |
| Example 2 | 3.9 | good |
| Example 3 | 6.9 | moderate |
| Comp. Ex. 1 | 3.4 | very poor |

Testing the tackiness

To test the tackifying effect of the novel tackifier powder, aqueous adhesive dispersions were prepared each having the compositions specified below. To prepare the aqueous adhesive dispersions, the starting materials employed were the dispersion DI-1, a 50% redispersion of the dispersion powder DP-1, and a 50% redispersion of the tackifier powder from Example 1.

Adhesive 1 (Comparison)

Aqueous redispersion of dispersion powder DP-1 with a solids content of 50%.

Adhesive 2

Mixture of the redispersions of dispersion powder DP-1 and of the tackifier powder from Example 1 in a weight ratio of 60/40, the mixture having a pH 3.9.

Adhesive 3

Mixture of the redispersions from DP-1 and tackifier powder from Example 1 in a weight ratio of 60/40. The pH of the mixture was adjusted with ammonia to 7.3.

Adhesive 4

Mixture of dispersion DI-1 and redispersion of the tackifier powder from Example 1 in a weight ratio of 60/40 (calculated as solids content/solids content). The pH of the mixture was 4.4.

Adhesive 5

Mixture of Dispersion DI-1 and redispersion of the tackifier powder from Example 1 in a weight ratio of 60/40 (calculated as solids content/solid content). The pH of the mixture was adjusted with ammonia to 7.3.

These adhesive dispersions were applied to a flexible PVC film using a box-type doctor knife in a uniform thickness and in an amount such that, after drying a dry application weight of about 50 g/m$^2$ was obtained. Drying took place at 70° C. for 30 minutes in a convection oven. After cooling to room temperature, the surface tackiness (tack) of the coatings was tested. For this purpose the tack was assessed by touching the applied adhesive using the finger (cleaned beforehand) and was evaluated qualitatively. In addition, the tack was tested by pressing typewriter paper (80 g/m$^2$) onto the surface of the coatings, using the thumb and applying uniform pressure for 5 seconds, and then immediately removing the paper again. The behaviour of the applied adhesive on removal of the paper was assessed qualitatively.

The tests results are compiled in Table 2.

TABLE 2

| Adhesive | Surface tack tested by | |
|---|---|---|
| | touch | paper removal |
| 1 | dry | no adhesion |
| 2 | slightly tacky | crackles on removal |
| 3 | tacky | slight fibre tearout |
| 4 | tacky | slight fibre tearout |
| 5 | very tacky | paper torn away completely |

What is claimed is:

1. Water-redispersible tackifier powder compositions comprising a) one or more tackifying substances, b) from 2 to 50% by weight, based on the overall dry weight of the tackifying substances, of one or more compounds selected from the group consisting of water-soluble, low molecular weight homopolymers or copolymers of olefinically unsaturated mono- or dicarboxylic acids or their anhydrides, having an acid content of more than 80 mol %, which, as copolymers, also contain from 2 to 50 mol % of further free-radically polymerizable monomers, and of phenolsulphonic condensates, the water solubility of the abovementioned compounds being at least 10 in 100 g of water at 23 C. and their molecular weight being 250,000 g/mol, determined as weight average, and c) from 0 to 30% by weight, based on the overall weight of polymeric constituents, of antiblocking agents.

2. A tackifier powder composition according to claim 1, wherein tackifying substances present are dimerized, disproportionated and hydrogenated resins, hydrocarbon resins, polyterpene resins, coumarone-indene resins, terpenephenol resins; liquids selected from the group consisting of diethylene glycol monobutylether acetate, diethylene glycol monobutyl ether, dipropylene glycol diether, dipropylene glycol monoester, and dipropylene glycol diester, plasticizers or mixtures of these substances.

3. Tackifier powder composition according to claim 1 wherein as component b) water-soluble, unneutralized or partially neutralized homopolymers or copolymers of olefinically unsaturated mono- or dicarboxylic acids or their anhydrides are present.

4. Tackifier powder composition according to claim 3, wherein as component b) homopolymers or copolymers of acrylic acid, methacrylic acid or maleic acid (anhydride), with a molecular weight $\leq 150,000$ g/mol are present.

5. Tackifier powder composition according to claim 4, wherein polyacrylic acid, polymethacrylic acid, copolymers with acrylic, methacrylic or maleic acid (anhydride) units and units of monomers copolymerizable therewith are present, the acid content of these copolymers being more than 80 mol %.

6. Pulverulent adhesives and aqueous adhesive dispersions based on water-insoluble polymers selected from the group consisting of the homopolymers and copolymers of vinyl esters, acrylic esters, methacrylic esters, styrene and vinyl chloride or a mixtures of these base polymers, comprising the tackifier powder composition according to claim 1 in powder form or in the form of its aqueous redispersion.

7. The adhesives of claim 6 which are selected from the group consisting of contact adhesives, flooring adhesives and structural adhesives.

8. A method of adhering two or more surfaces to one another which comprises contacting at least a portion of a first surface with the adhesive of claim 6 and contacting a second surface to the adhesive on the first surface.

9. The tackifier composition of claim 2 wherein said liquids are selected from the groups consisting of diethylene glycol monobutylether acetate, diethylene glycol monobutylether, dipropylene glycol mono ether or dipropylene glycol diether, dipropylene glycol monoester or dipropylene glycol diester, and 2-hydroxyethyl phenyl ether and mixtures thereof.

10. The tackifier composition of claim 2 wherein the plasticizer is selected from the group consisting of phthalates, sebacates, adipates and mixtures thereof.

11. The water-redispersible tackifier powder composition prepared by drying an aqueous dispersion of the composition of claim 1.

* * * * *